United States Patent [19]
Kaya et al.

[11] Patent Number: 5,489,809
[45] Date of Patent: Feb. 6, 1996

[54] POWER CONTROL UNIT FOR ELECTRONIC DEVICE

[75] Inventors: Syuuji Kaya; Masao Okumura, both of Yamoto-Koriyama, Japan

[73] Assignee: Sharp Kabushiki Kaisha, Osaka, Japan

[21] Appl. No.: 88,238

[22] Filed: Jul. 7, 1993

[30]  Foreign Application Priority Data

Jul. 10, 1992 [JP] Japan ................... 4-183309

[51] Int. Cl.$^6$ .................................................. H04Q 9/00
[52] U.S. Cl. ...................... 307/126; 307/66; 340/310.01
[58] Field of Search ................... 307/38–41, 29,114–116, 307/126, 85, 86, 66; 340/310 A, 310 R

[56]  References Cited

U.S. PATENT DOCUMENTS 3,541,392  11/1970  Vargo et al. ...................... 307/126
4,418,333  11/1983  Schwarzbach ................... 340/310 A
5,315,161  5/1994  Robinson ............................ 307/66

FOREIGN PATENT DOCUMENTS 64-13896  1/1989  Japan .

*Primary Examiner*—William M. Shoop, Jr.
*Assistant Examiner*—Peter Ganjoo
*Attorney, Agent, or Firm*—David G. Conlin; Brian Michaelis

[57]  ABSTRACT

A pair of electronic devices connected through a communication cable serve as a sending device and a receiving device, respectively. The electronic device on the sending device includes a generator for generating a control signal. The control signal operates to turn on a power supply of the electronic device on the receiving side when the power supply of the electronic device on the sending side is turned on or to turn off the electronic device on the receiving side when the electronic device on the sending side is turned off. The control unit is included in the electronic device on the receiving side. In response to the control signal given from the generator, the control unit operates the power supply of the electronic device on the receiving side.

3 Claims, 4 Drawing Sheets

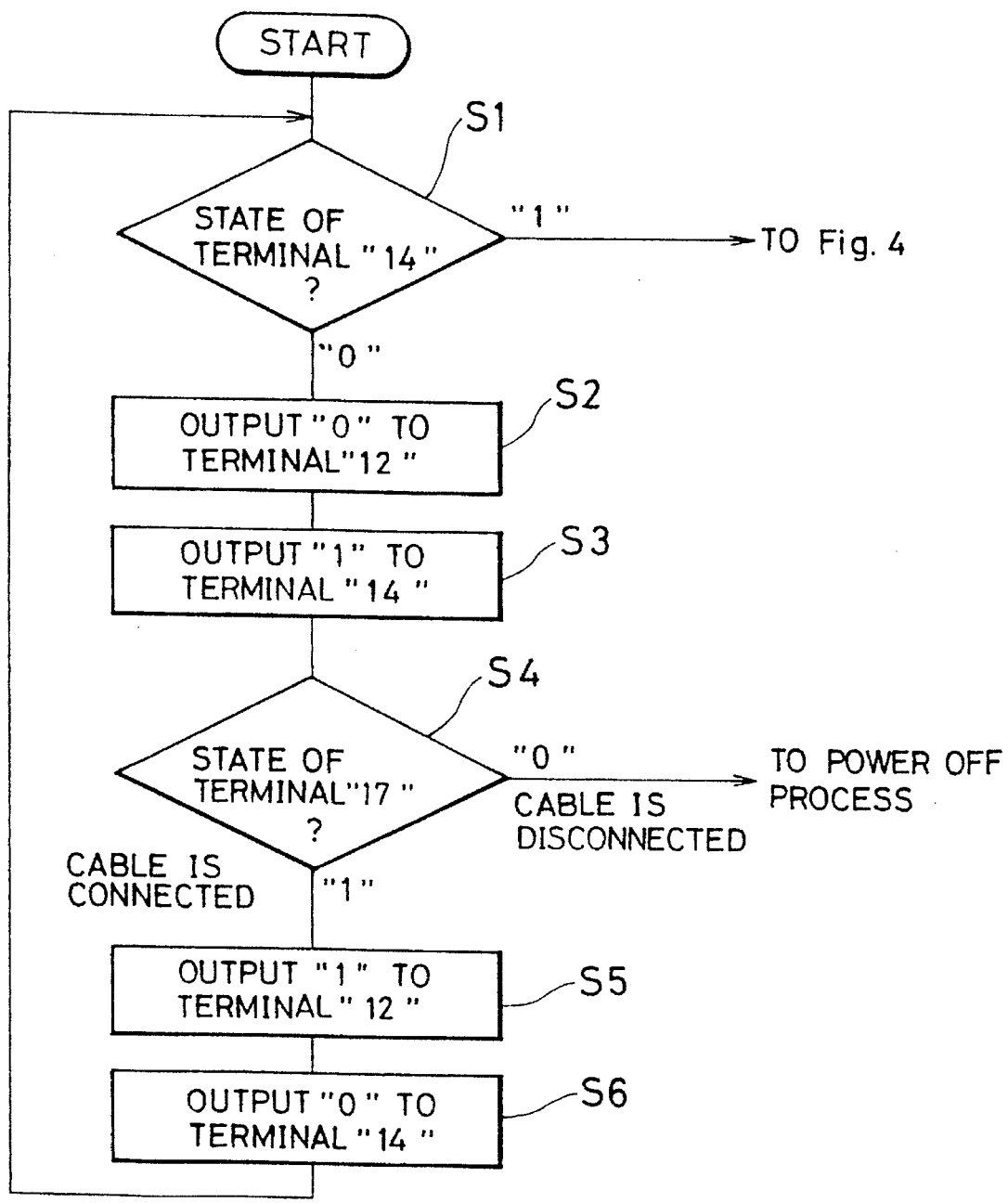

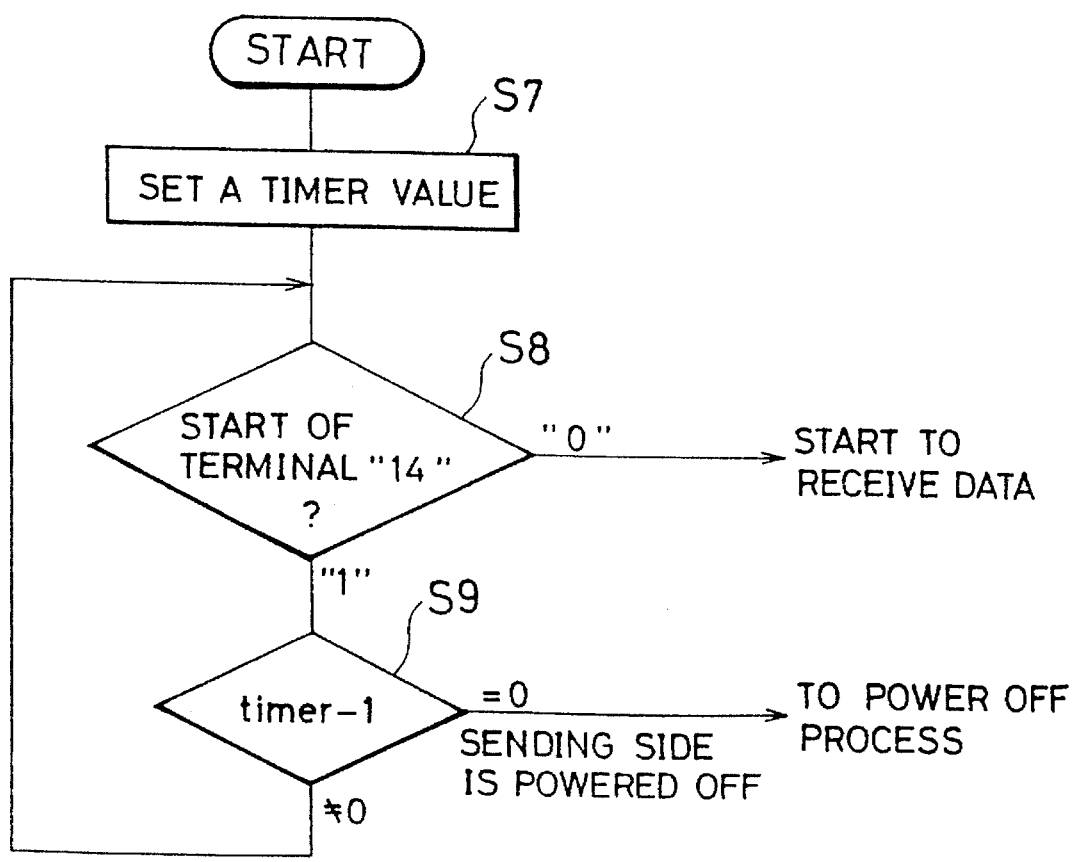

POWER CONTROL UNIT FOR ELECTRONIC DEVICE

BACKGROUND OF THE INVENTION

1. Field of the Invention

The present invention relates to a power control unit for an electronic device, and more particularly to the power control unit which may apply to a pair of electronic devices connected through a communication cable, one electronic device may control the power of the other electronic device.

2. Description of the Related Art

To control the power on or off of one device from the other device if two devices having the corresponding power sources are connected through a cable, the inventors of the present application know that there have been already proposed two techniques, which will be described below.

(1) In such a case that a power of the CRT is controlled from a personal computer.

Consider that a pair of electronic devices serving as a power feeder and a power receiver and the electronic device serving as the power feeder (controlling device) provides a plug socket, a power supply circuit, a power control circuit for the power supply circuit and the electronic device serving as the power receiver (controlled device) provides a power circuit and an AC cord with a plug. The plug of the controlled device is connected to the plug socket. When the controlled device is powered on, the power is fed to the plug socket from which the power is sent to the power supply circuit through the AC cord in the controlled device. In this arrangement, the controlled device is powered on or off by the controlling device.

(2) In such a case that the TV is powered on and off by remote control

The controlled device receives a command by any communication means from the controlling device and operates in response to this command. The communication means provides power on and off commands on which the controlled device is operated. To turn on the power supply circuit, it is necessary to constantly keep power on in the section for receiving the commands of the controlled device so that the section may receive the powered-on command from the controlling device for turning on the overall controlled device.

Next, consider that a portable electronic device such as an electronic note or a function calculator serves as controlling a power of its peripheral device.

The foregoing technique (1) is suitable to only the arrangement that both of the portable electronic device and the relevant peripheral device are AC powered and are located within the reach of the power cord. If any one of them is battery powered, it is necessary to connect both of them through a cable and transmit the voltage indicating a power on or off state from the controlling device to the controlled device. To do so, an extra cable and an extra terminal are required. So, the implementation of this arrangement needs to be costly.

To use the foregoing technique (2), it is necessary to constantly have power on the section for receiving a command, since the power on command has to be received while the controlled device is powered off. This is meaningful in the case that the power consumption of the section for receiving a command is far smaller than the overall circuit, such as in a TV.

However, the technique (2) is not meaningless in such a circuit arrangement like an electronic note that the section for receiving a command (normally configured of a communication interface, a CPU, a ROM, and a RAM, etc.) is considerably larger than the overall circuit arrangement. This is because the section cannot be operated while the power is turned off.

That is, in the small electronic device and its relevant peripheral device, the peripheral device is turned on immediately when the small electronic note served as the controlling device is turned on and the former is turned off when the latter is turned off. This operation is usually convenient. However, as mentioned above, as far as the inventors of the present applicant know, such a power control as the above is not applied to this arrangement. The power switches are normally provided in both of the small electronic device and the peripheral device.

SUMMARY OF THE INVENTION

It is an object of the present invention to provide a power control unit which operates to control the power supply by transmitting a power on or off state through a communication cable in a case that a pair of electronic devices provide their internal power supply circuits and are connected through the communication cable.

It is a further object of the present invention to provide a power control unit which just needs a conventional communication cable to be connected between two electronic devices independently of the type of the power supplies provided in the electronic devices.

It is a yet further object of the present invention to provide a power control unit which just needs quite a small circuit component to be constantly kept on in the controlled side.

It is another object of the present invention to provide a power control unit which needs a simple circuit component to be increased, provided that a pair of electronic devices are connected through a communication cable and one circuit serves to control the power on and off of the other circuit.

In carrying out the objects, a power supply control unit for a pair of electronic devices is connected through a communication cable, to the pair of electronic devices one serving as a sending side and the other serving as a receiving side. The power supply control unit includes: means for generating a control signal for turning on a power supply of the electronic device on the receiving side when a power supply of the electronic device on the sending side is turned on or turning off the power supply of the electronic device on the receiving side when the power supply of the electronic device on the sending side is turned off; and means for controlling the power supply of the electronic device on the receiving side in response to the control signal from the generating means.

In function, the electronic device having a power supply built therein is connected to the other through the communication cable. If the power supply is turned on, the other is automatically powered on, or vice versa.

This system may apply to one sender to more receivers or vice versa. If any one side is powered on, the other side is interactively powered on.

Further objects and advantages of the present invention will be apparent from the following description of the preferred embodiment of the invention as illustrated in the accompanying drawings.

BRIEF DESCRIPTION OF THE DRAWINGS

FIG. 3 is a flowchart showing a control operation for controlling the power supply of the receiving side off when the receiving sides are turned on and a communication cable is disconnected; and FIG. 4 is a flowchart showing a control operation for controlling the power supply of the receiving side off when the power supply of the sending side is turned off.

DESCRIPTION OF THE PREFERRED EMBODIMENT

Figure 1:
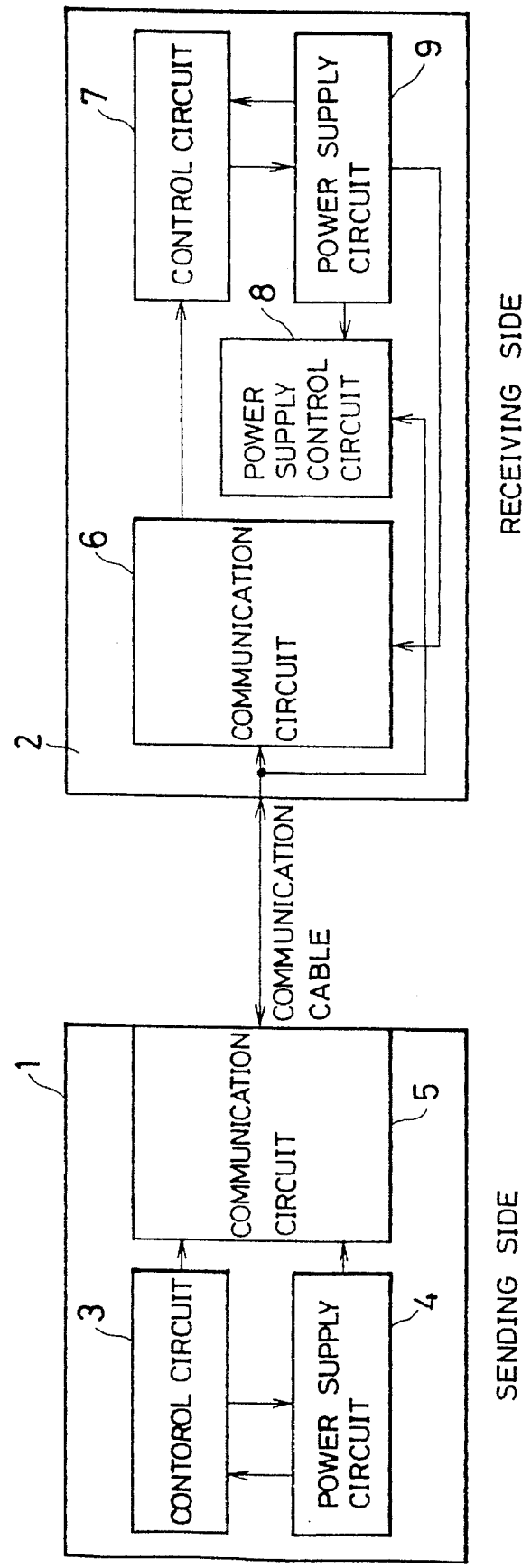
FIG. 1 is a block diagram showing the insides of electronic devices on the sending side and the receiving side according to an embodiment of the present invention.

The description will be oriented to a power control unit provided in an electronic device according to an embodiment of the present invention as referring to the drawings. It goes without saying that this embodiment does not define the present invention.

FIG. 1 is a block diagram showing a power control unit according to the embodiment of the present invention. A sending electric device 1 serving as a sending side and a receiving electric device 2 serving as a receiving side are connected by communication circuits 5 and 6. The electronic device 1 serving as a sending side provides a power supply circuit 4 and a control circuit 3 for controlling the power supply circuit 4. The electronic device 2 serving as a receiving side provides a power supply circuit 9, a control circuit 7 for controlling the power supply circuit 9, and a power supply control circuit 8 for controlling the power supply of the electric device 2. The electronic device 1 operates the control circuit 3 so that the control circuit 7 and the power supply circuit 9 of the receiving side are operated to control a power supply control circuit 8. The power supply control circuit 8 operates to control the power supply of the electronic device 2.

Figure 2:
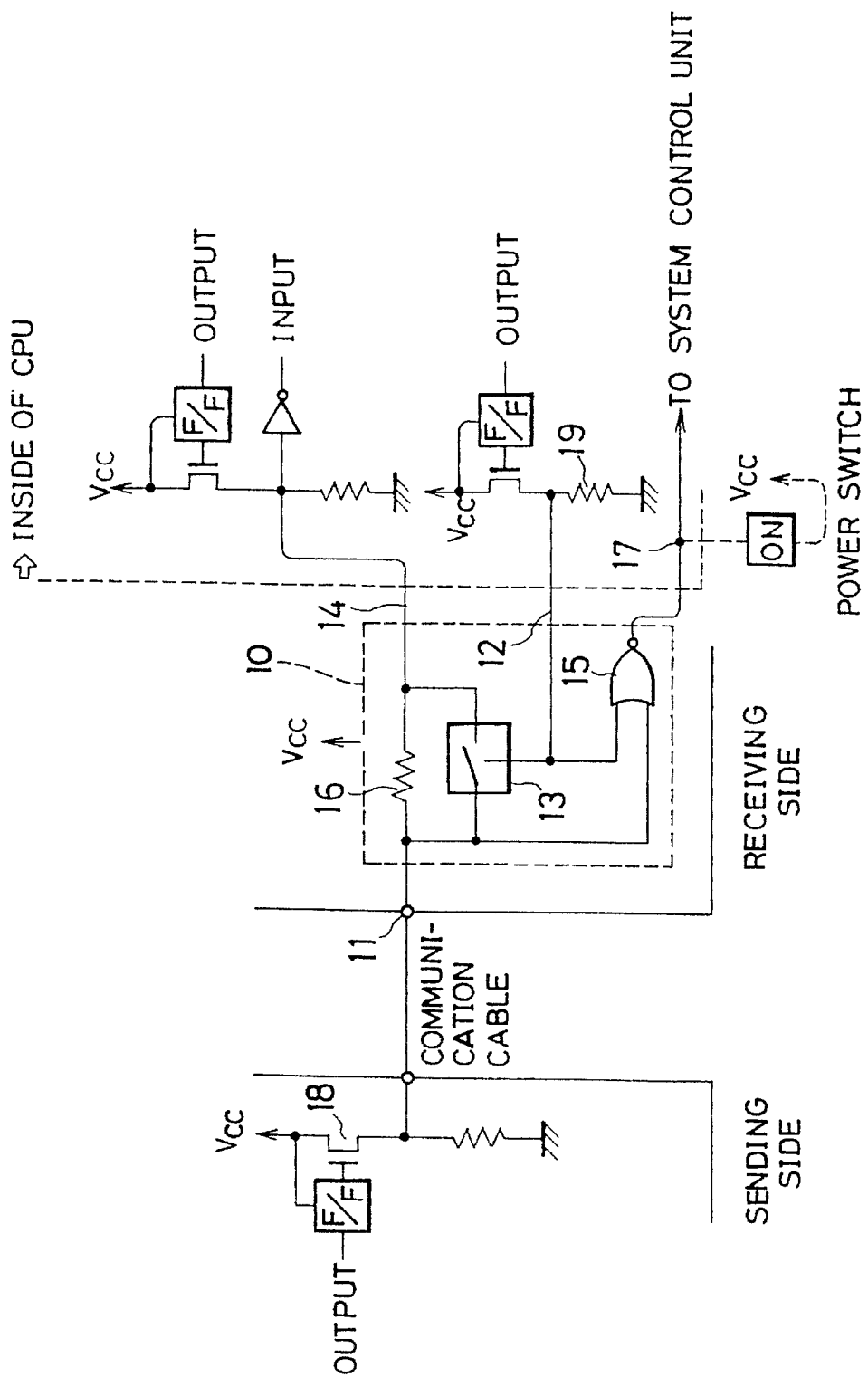
FIG. 2 is a circuit diagram showing a control circuit included in the electronic devices shown in FIG. 1.

FIG. 2 shows an essential circuit of the arrangement shown in FIG. 1 for explaining the present invention. As shown in FIG. 2, there are shown the sending device, the receiving device and the communication cable connected between an output terminal of the sending side and an input terminal of the receiving side. Though not shown in FIG. 2, a ground of the sending side and a ground of the receiving side are connected to each other through the communication cable. A circuit 10 shows a part of circuit newly added in this embodiment, which corresponds to the feature of the present invention. The arrangement and the operation of the circuit part 10 are as follows.

To constantly keep the state of an output terminal when the power is off and to power on the circuit part 10 while the power is off, it is necessary to feed power to the circuit part 10 shown in FIG. 2 and a system control section leading from a point denoted by 17.

Terminal 11 is a point at which the state of data signal sent from the sending side is received through the communication cable.

In the case of the sending side being powered on and the communication cable being connected between the sending and receiving side, if no data is sent, the terminal 11 is kept at "0". While data is being sent from the sending side, the data signal is a square waveform consisting of "1" and "0" values. This waveform is read in the input side so that the control circuit 7 (see FIG. 1) comprised of a CPU may analyze the content.

In the case of the sending side being powered off and the communication cable being connected between the sending and receiving side, the sending side outputs a value of "1" to distinguish with the power-on state. While data is being sent, the terminal is kept at "1". After a certain interval of time (the longest time allowing the terminal 11 to constantly be at "1", defined by a communication protocol), a value of "0" inevitably takes place at the terminal. If a value of "1" is kept at the terminal after the interval of time, it indicates that the sending side is powered off.

In some cases the communication cable may not be connected. The state of a terminal 14 appears at the terminal 11 through a resistor 16. That is, if a value of "1" is at the terminal 14, a value of "1" is at the terminal 11. Knowing a value of "0" is at the terminal 14, a value of "0" is at the terminal 11.

Terminal 12: represents the control terminal of the main circuit.

In the case of the receiving side being powered on, a value of "1" is normally output. If the communication cable is not connected or the sending side is powered on, a value of "0" is outputted.

In the case of the receiving side being powered off, a value of "0" is outputted. As illustrated in FIG. 2, reference numeral 13 represents a switch circuit.

When a value of "1" is at the terminal 12, the switch 13 is closed. Both ends of a resistor 16 are short-circuited so that the state of the terminal 14 may be that of the terminal 11.

When a value of "0" is at the terminal 12, the switch 13 open. Reference number 14 designates an input/output port (I/O Port).

In the case of the receiving side being powered on, a value of "0" is outputted so that it may serve as an input port. In this port, an output resistance given when a value of "1" is outputted (resistance given when the output of the transistor 18 is "1") is less than an output resistance given when a value of "0" is outputted (value of the resistor 19). Hence, even when the sending side outputs a value of "1", a value of "1" is properly input at the terminal 14. A value of "1" is outputted to know whether no communication is done, the communication cable is not connected, or the powered on sending side is connected.

In the case of the receiving side being powered off, a value of "1" is outputted.

15: NOR Gate Circuit

A value of "1" is outputted only when a value of "0" appears at both inputs of a NOR gate 15. A value of "0" is outputted in the other case.

16: Resistance

A resistance of a resistor 16 has a far larger value than the resistance given when a transistor 18 outputs a value of "1" or the resistance of a resistor 19. Hence, when the terminal 11 has a different value from the terminal 14 (the terminal 11 has a value of "1" while the terminal 14 has a value of "0" or vice versa) and the switch 13 is open, the output level at the terminal 11 and the output level at the terminal 14 keep the same value of "0" or "1".

When the communication cable is not connected and the switch 13 is open, the state of the terminal 14 appears at the terminal 11. Hence, the resistance has a limitable proper value. For example, when the transistor 18 outputs a value of "1", the resistance 16 is 1 kilohm (KΩ), the resistance 19 is 125 KΩ and the resistance 16 is 560 KΩ.

In the case of the power being off on the receiving side, the power is kept off when a value of "0" appears at the terminal. By keeping this terminal 17 at a value of "1" for a certain length of time or longer, the receiving side is automatically powered on.

That is, the power switch is essentially connected to the terminal 17 on the receiving side. The power switch is pressed so that the voltage at the terminal 17 may be applied to the system control circuit, which serves to power on the overall power supply. In this embodiment, the power switch is removed and the circuit part 10 is located in its place.

In the case of the power being on, on the receiving side the state of the power supply is independent of the value of the terminal 17. The state of the terminal 17 is allowed to be monitored by the control section. It is used for discriminating whether or not the communication cable is connected.

When the receiving side is powered off, the terminal 12 has a value of "0". When the powered-off sending side is connected to the terminal 11, a value of "1" appears at the terminal 11. Hence, a value of "0" is outputted at the terminal 17. The power is kept off. When the sending side is not connected to the terminal 11, the state of the line 14, that is, "1" is made to be the state of the terminal 11. The power remains off. When the powered-on sending side is connected to the terminal 11, the terminal 11 has a value of "0". Hence, the value of "1" appears at the terminal 17. Hence, the receiving side is powered on.

Since the receiving side does not provide a power on/off switch, the receiving side has to automatically be powered off by sensing the power-off state of the sending side. The control method for turning off the power by using the circuit shown in FIG. 2 is shown in FIGS. 3 and 4. FIG. 4 shows the control method for powering off the receiving side by sensing the power-off state of the sensing side, when the sending side is powered off. And FIG. 3 shows the control method for powering off receiving side, when the receiving side is powered on and the communication cable is disconnected. Both of the control methods are the methods for the state of receiving data. So, they are built in a data-receiving routine.

When a value at the terminal 14 is "1", the sending side is connected to the receiving side. It means that the sending side just starts to send data or the sending side is powered off. So, the operation goes to the control shown in FIG. 4. If the value of the terminal 14 is "0", no communication is done or the communication cable is disconnected. Hence, if a value of "0" is inputted to the terminal 12 for cutting the switch 13 so that a value of "1" may be inputted to the terminal 14, a value of 1 appears at the terminal 11 and a value of "0" appears at the terminal 17 if the communication cable is disconnected. If the communication cable is connected, the terminal 11 has a value of "0" but the terminal 17 has a value of "1". It indicates whether or not the communication cable is connected.

If the state of the terminal 14 keeps a value of "1" for a certain interval of time or more, it indicates that communication data is not sent from the sending side and the sending side is powered off. If the terminal 14 has a value of "0", it indicates communication data is sent. Then, the receiving operation is started.

Many widely different embodiments of the present invention may be constructed without departing from the spirit and scope of the present invention. It should be understood that the present invention is not limited to the specific embodiments described in the specification, except as defined in the appended claims.

What is claimed is:

1. A power supply control unit for a pair of electronic devices provided with respective power supply units and connected through a communication cable, one serving as a sending side and the other serving as a receiving side, comprising:

generating means provided in said electronic device on the sending side for generating a two-leveled control signal to be used for turning on or off a power supply of said electronic device on the receiving side when a power supply of said electronic device on the sending side is turned on or off, said control signal being transmitted through said communication cable to said electronic device on the receiving side; and control means provided in said electronic device on the receiving side for controlling the power supply of said electronic device on the receiving side to be turned on or off in response to said control signal from said generating means, said control signal being set to low level when said electronic device on the sending side is turned on and being set to high level when said electronic device on the sending side is turned off, wherein said control means of said electronic device on the receiving side includes:

a first terminal connected to said electronic device on the sending side through said communication cable, a second terminal connected to said first terminal, a resistor inserted between said first and second terminals and having much higher resistance than resistance of said electronic device oh the sending side, a first switching means connected between said first and second terminals in parallel with said resistor for selectively short-circuiting between said first and second terminals, a second switching means connected to said second terminal for selectively controlling state of said first terminal, a third switching means connected to control said first switching means for selectively controlling said first switching means, and a gate means connected to said first terminal and said third switching means, an output of said gate means being used for controlling said power supply of said electronic device on the receiving side, output of said gate means being set to turn on said electronic device on the receiving side when said first terminal delivers a low level signal indicating that said electronic device on the sending side is turned on and said third switching means delivers a low level signal indicating that said electronic device on the receiving side is turned off, output of said gate means being set to turn off said electronic device on the receiving side when said communication cable is determined to be disconnected by checking that said first terminal delivers a low level signal when said third switching means delivers a temporary low level signal not to short-circuit said resistor while said electronic device on the receiving side is turned on and said second terminal delivers a low level signal indicating that said electronic device on the receiving side is turned on.

2. A power supply control unit as claimed in claim 1, wherein said control means further discriminates a reception of said control signal and a reception of communication data sent from said electronic device on the sending side through said communicable cable.

3. A power supply control unit as claimed in claim 2, wherein said control means discriminates a reception of said another signal from a reception of communication data sent from said electronic device on the sending side by judging as to whether a signal sent through said communication cable is maintained in one state during a predetermined time period.

* * * * *